United States Patent [19]

Barbier et al.

[11] Patent Number: 4,754,600
[45] Date of Patent: Jul. 5, 1988

[54] AXIAL-CENTRIPETAL SWIRLER INJECTION APPARATUS

[75] Inventors: Gerard Y. G. Barbier, Morangis; Gerard J. P. Bayle-Labouré, Avon; Michel A. A. Desaulty, Vert Saint Denis; Rodolphe Martinez, Perigny s/Yerres; Jerôme Perigne, Vaux le Penil, all of France

[73] Assignee: Societe Nationale d'Etude et de Construction de Moteurs d'Aviation (SNECMA), Paris, France

[21] Appl. No.: 28,676

[22] Filed: Mar. 20, 1987

[30] Foreign Application Priority Data

Mar. 20, 1986 [FR] France ................. 86 03971

[51] Int. Cl.⁴ ........................... F02C 9/00; F02C 1/00
[52] U.S. Cl. ..................................... 60/39.23; 60/737; 60/748
[58] Field of Search ............... 60/39.23, 39.27, 740, 60/742, 748, 734, 737; 239/402.5, 404

[56] References Cited

U.S. PATENT DOCUMENTS

| | | | |
|---|---|---|---|
| 2,446,059 | 7/1948 | Peterson et al. | 60/39.23 |
| 3,490,230 | 1/1970 | Pillsbury et al. | |
| 3,853,273 | 12/1974 | Bahr et al. | |
| 3,958,413 | 5/1976 | Cornelius et al. | 60/39.23 |
| 4,085,579 | 4/1978 | Holzapfel et al. | 60/39.29 |
| 4,162,611 | 7/1979 | Caruel et al. | |
| 4,263,780 | 4/1981 | Stettler | 60/748 |
| 4,297,093 | 10/1981 | Morimoto et al. | |
| 4,385,490 | 5/1983 | Schirmer et al. | |
| 4,447,010 | 5/1984 | Maeda et al. | |
| 4,563,875 | 1/1986 | Howald | 60/737 |
| 4,726,182 | 2/1988 | Barbier et al. | 60/39.23 |

FOREIGN PATENT DOCUMENTS

| | | |
|---|---|---|
| 386159 | 1/1923 | Fed. Rep. of Germany . |
| 1039785 | 9/1958 | Fed. Rep. of Germany . |
| 2356427 | 10/1973 | Fed. Rep. of Germany . |
| 2416909 | 6/1974 | Fed. Rep. of Germany . |
| 2511172 | 3/1975 | Fed. Rep. of Germany . |
| 2936073 | 3/1980 | Fed. Rep. of Germany . |
| 2522393 | 2/1982 | Fed. Rep. of Germany . |
| 2206796 | 11/1972 | France . |
| 2270448 | 5/1974 | France . |
| 2357738 | 7/1976 | France . |
| 2391359 | 7/1976 | France . |
| 2491139 | 10/1981 | France . |
| 2491140 | 10/1981 | France . |
| 2505401 | 5/1982 | France . |
| 2572463 | 10/1984 | France . |
| 323713 | 9/1957 | Switzerland . |
| 1572336 | 7/1930 | United Kingdom . |
| 644719 | 10/1950 | United Kingdom . |
| 663639 | 12/1951 | United Kingdom . |
| 672530 | 5/1952 | United Kingdom . |
| 2085147 | 4/1982 | United Kingdom . |
| 2134243 | 8/1984 | United Kingdom . |

Primary Examiner—Louis J. Casaregola
Assistant Examiner—Timothy S. Thorpe
Attorney, Agent, or Firm—Bacon & Thomas

[57] ABSTRACT

A swirler for a gas turbine fuel injection apparatus is disclosed in which the intake air is directed both axially and radially to maximize the efficiency of the gas turbine during all modes of operation. Circumferentially alternating axial and radial passages are defined by the swirler member surrounding the fuel injection nozzle. A diaphragm control is provided to selectively control the amount of air passing through the axial and radial passages, depending upon the operational mode of the gas turbine.

15 Claims, 9 Drawing Sheets

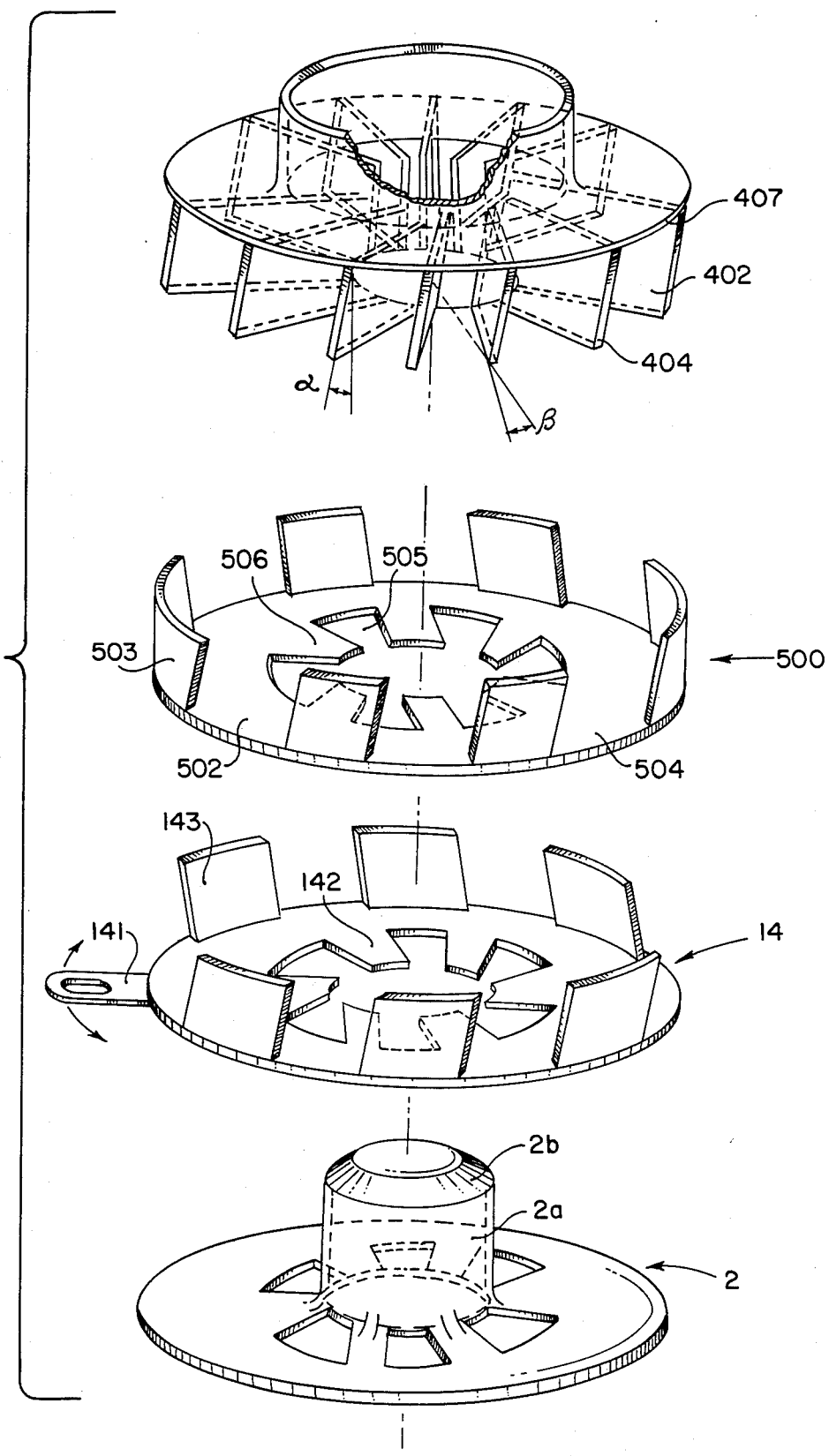

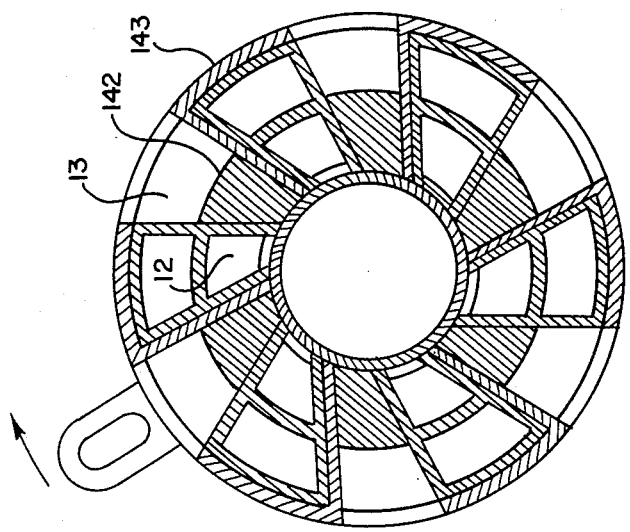
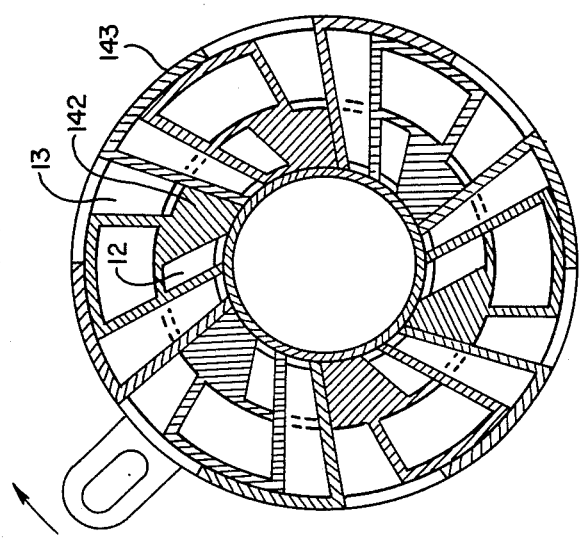
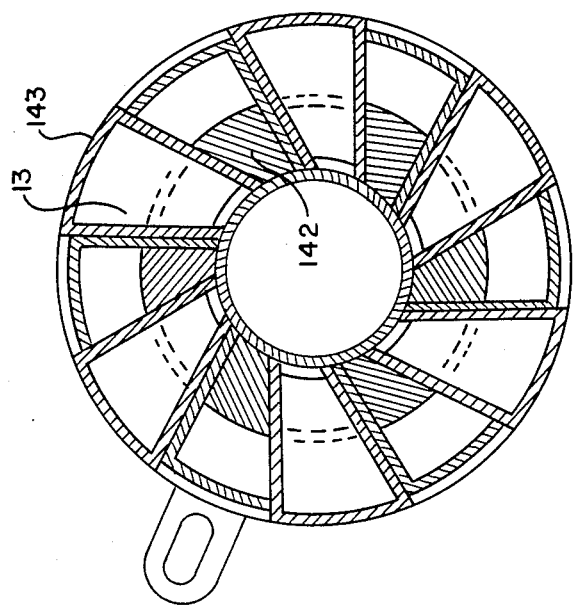

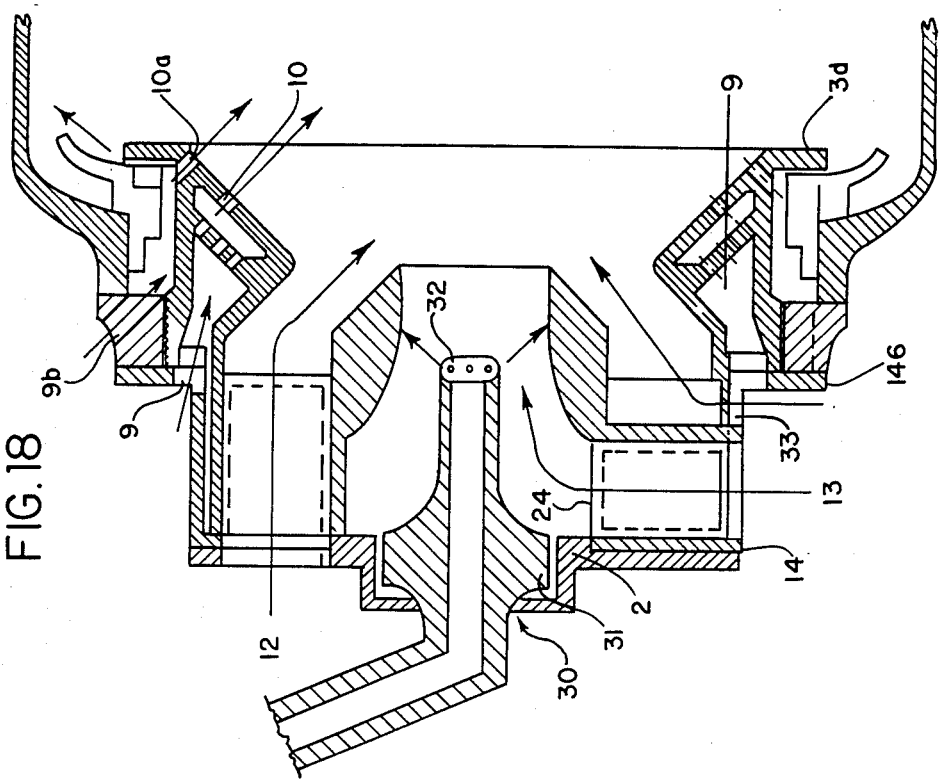
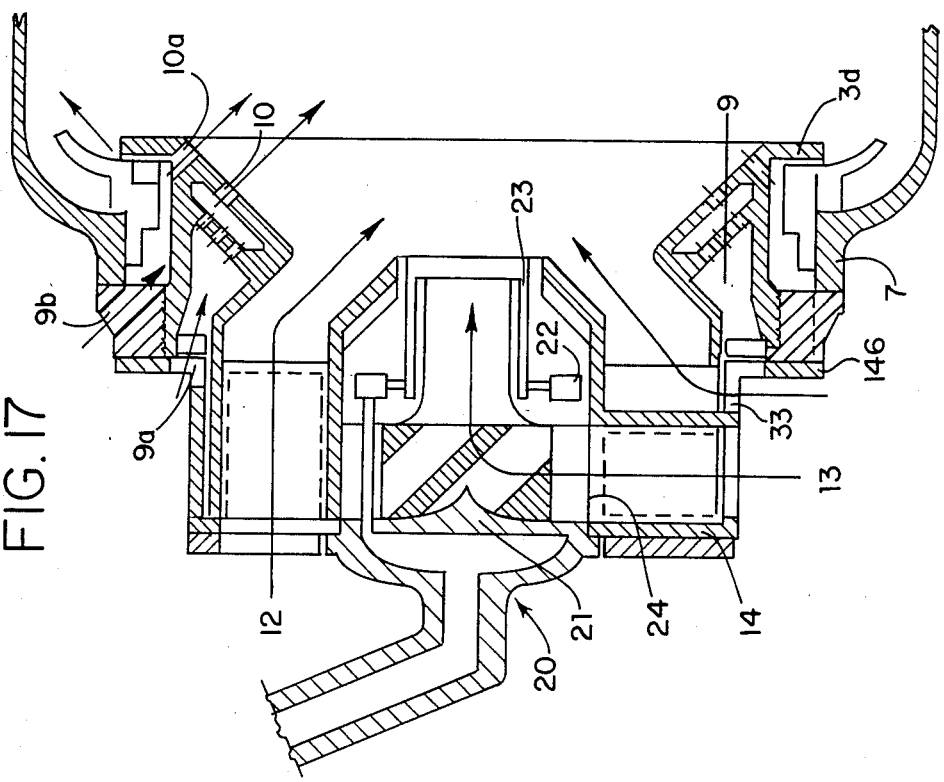

AXIAL-CENTRIPETAL SWIRLER INJECTION APPARATUS

BACKGROUND OF THE INVENTION

The present invention relates to a primary air and fuel supply for a combustion chamber of a gas turbine engine.

In the field of gas turbines, such as turbojet engines, it is necessary to compromise the design criteria in order to achieve full power combustion chamber performance and also to achieve acceptable idle performance. The compromise between these operational parameters necessary to achieve minimum smoke emission, effective thermal strength of the chamber walls and the temperature distribution during full power operation; and to achieve efficiency and flame stability during idle performance is in the selection of the air fraction injected into the primary combustion zone during the various operating modes. The primary air is admitted into the combustion chamber through swirl vane structures, known as swirlers, through orifices located in the upstream end of the combustion chamber, and through openings in the inner and outer walls of the combustion chamber.

It is well known to use combustion chambers having two modules, one module being optimized for idler performance while the other module is optimized for full power performance. However, these chambers have not totally obviated the problems of the prior art since, aside for their increased weight and bulk, they create regulation difficulties in operational modes between idle and full power.

It has been proposed to obviate these difficulties by making the combustion chambers with a "variably geometry" wherein the air flow supply is continuously matched to the operational mode by a movable diaphragm which controls the air flowing through the combustion chamber air intakes. Typical examples of these systems are set forth in French Pats. Nos. 2,491,139 and 2,491,140. These patents show such control diaphragms controlling either the air flowing through the radial swirler (No. 2,491,139) on the air flowing the axial swirler (No. 2,491,140) of an otherwise conventional fuel injection apparatus. However, these devices suffer from poor air guidance across the swirler intakes and also produces significant wakes in the air flow within the combustion chamber.

It is also known to utilize an intermediate bowl structure interposed between the upstream end of the combustion chamber and the fuel injector. As shown in U.S. Pat. No. 4,162,611, in these devices the intermediate bowl has a frusto-conical portion flaring outwardly in a downstream direction and defines a plurality of small diameter holes through which highly pressurized air enters the atomized fuel cone issuing from the fuel injector. Due to the thorough mixing of the fuel and air achieved by the intermediate bowl member, it completes the function of the fuel injector and makes possible the formation of a primary "mini-zone" during idle conditions.

The intermediate bowl members also have air intakes which may be controlled by a modulating diaphgram, which diaphragm may also control the intake of air through the external swirler. Thus, the air flow can be controlled to modulate the exhaust flow so as to match the richness of the air-fuel mixture at the air exit of the intermediate bowl of operational conditions of the combustion chamber.

SUMMARY OF THE INVENTION

The present invention improves over the known types of aerodynamic fuel injector having an intermediate bowl member with an air flow modulating diaphragm by replacing the external radial swirler by an external compound swirler having both radial and axial air flows. Thus, an object of the invention is to provide a swirler of more compact dimensions than the known radial swirler in which the outer diameter is determined by the requirements of mounting the control diaphragm to allow a virtual total air flow shut down at idle.

Another object of the present invention is to vary the turbulence component of the air leaving the injection system as a function of the operational mode to best match the volumetric distribution of the air-fuel mixture in the reaction zone. The flame stability at idle is improved by increasing the tangential component of the air flow at idle. The full power operation mode is also improved by decreasing the tangential component and simultaneously increasing the axial component. The present invention also provides means to continuously modulate these parameters throughout the entire operational range of the combustion chamber.

Broadly, the invention relates to an air-fuel injection apparatus for a combustion chamber of a gas turbine engine having at least one fuel injector, a swirler to pass fuel atomizing air into the chamber, an intermediate bowl member interposed between the fuel injector and an upstream end of the combustion chamber, the bowl member having a downstream flange flaring outwardly in the downstream direction and provided with holes to inject air into the atomized cone of fuel and a chamber for impingement cooling having air intake orifices.

According to the invention, the swirler structure has an even number of swirl vanes which define the same number of intake air passages therebetween. A first plurality of air passages define axial air intakes, while a second plurality of air passages define radial air intakes. Thus, the air exhausted from the first and secon passages of the swirler are axial-centripetal. The air passages are oriented such that the first and second passages alternate about the circumference of the swirler.

In a first embodiment, each vane of the swirler subtends a first acute angle $\alpha$ relative to a generatrix of a cylinder enclosing the swirler and a second acute angle $\beta$ with the radius of the swirler.

In a second embodiment, the facing sides of adjacent swirler vanes which define the first air passages subtend an acute angle $\alpha$ relative to the generatrix of the cylinder enclosing the swirler, whereas the opposite blade sides which define the second air intake passages subtend a second acute angle $\beta$ relative to a radius of the swirler.

The invention also encompasses a modulating diaphragm to control the flow of air passing through the swirler between the idler and full power modes of operation. The modulating diaphragm consists of a rotary ring fitted on an external cylindrical support of the swirler having a first plurality of barriers to control the air flowing into the first air intake passages and a second plurality of barriers to control the air flowing into the second plurality of air passages. The axial-centripetal swirling apparatus according to the invention may be utilized with a central fuel injector of the swivel type with point fuel-injection orifices, or with a central fuel injector of fuel injector having an annular injection manifold. The first axial air passages constitute an external swirler for the injection apparatus, whereas the second, radial air passages issue into a central sleeve housing the fuel injector to form an internal swirler for the injection apparatus.

BRIEF DESCRIPTION OF THE DRAWINGS

FIG. 1a is an exploded, perspective view of the swirler structure according to the invention.

FIGS. 9a–9c show a sequential operation of the control diaphragm for the swirler shown in FIG. 8 progressing from idle operation, through an intermediate operating level to full power operation.

FIG. 17 is a partial, longitudinal cross-sectional view showing the swirler according to the invention utilized in conjunction with a simplified fuel injector having a cooled base with an annular fuel injection manifold.

FIG. 18 is a partial, longitudinal cross-sectional view showing the swirler apparatus according to the invention utilized in conjunction with a swivel fuel injector having point injection orifices.

DETAILED DESCRIPTION OF THE PREFERRED EMBODIMENTS

Figure 1:
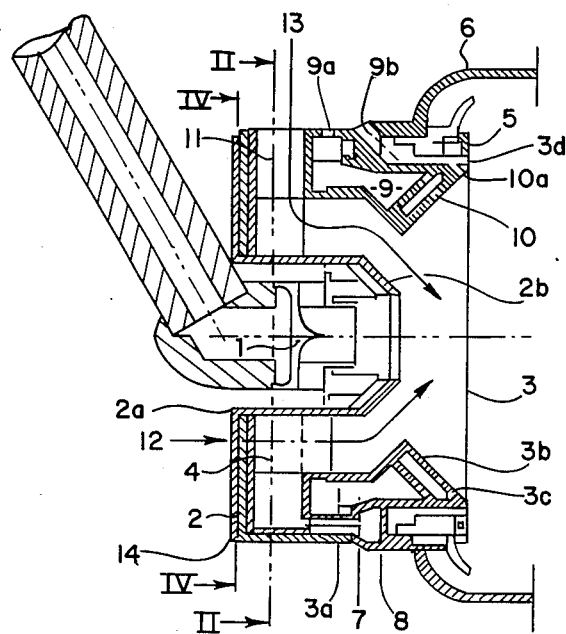
FIG. 1 is a partial, longitudinal sectional view of the swirler apparatus according to the invention.

As shown in FIGS. 1–7, the invention relates to an air-fuel injection apparatus for the combustion chamber of a gas turbine engine wherein a central fuel injector 1 is located within a central sleeve 2 having cylindrical support portion 2a which terminates in a downstream direction into frusto-conical portion 2b. The central sleeve 2 constitutes a central part of the intermediate bowl member 3 which comprises cylindrical portion 3a coaxial with and radially outwardly of the sleeve 2 and ending at the downstream end in a frusto-conical support portion 3b and an outwardly flared frusto-conical support portion 3c to form the wall of the bowl. References made to U.S. Ser. No. 792,685 to Barbier et al, filed on Oct. 29, 1985 for a more complete description of the structure and function of the intermediate bowl shaped member, per se. The portions 2a, 2b, 3a and 3b form an axial-centripetal duct for the air exhausting from external swirler 4, which is the object of the present invention.

The intermediate bowl shaped member 3 has radial extension 3d extending from the downstream portion 3c against mounting 5 which is solidly joined to the upstream end of the combustion chamber 6. Any known means may be utilized to rigidly attach the mounting 5 to the combustion chamber, such as a nut 7 fastened on an outer cylindrical support 8 rigidly fixed to the downstream flange 3c. The intermediate bowl member 3 defines an annular chamber 9 which is supplied with air through orifices 9a, by known means, to provide cooling by air impingement of the downstream flange 3c. Flange 3c defines a plurality of small diameter orifices 10 through which the cooling air escapes to provide additional atomizing of the fuel supplied from injector 2 flowing in a conical sheet along the inner wall of downstream flange 3c.

The external swirler 4 comprises an even number of swirl vanes 11 that between them define equal number of air passages although twelve such air passages are shown. It is to be understood that other numbers of air passages may be utilized without exceeding the scope of this invention. A plurality of first air passages 12 have axial intakes and air passes over the vanes in a substantially axial direction as shown in FIG. 1. A plurality of second air passages 13 have radial intakes and pass air substantially in a radially inward direction as indicated in FIG. 1. The first and second air passages alternate about the circumference of the generally cylindrical swirler 4 and are located such that the outlets of all of the air passages are located between the central sleeve portions 2a and 2b, and the inner wall 3a and 3b of intermediate bowl member 3.

Figure 4:
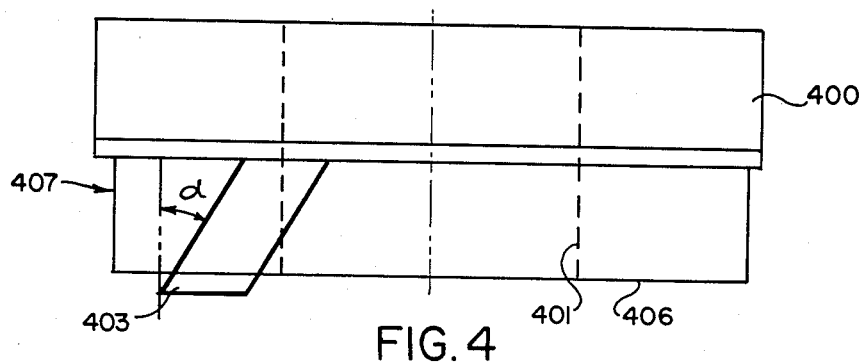
FIG. 4 is a plan view of a generally cylindrical member utilized in the swirler according to the invention prior to forming the swirl vanes thereon.
Figure 4A:
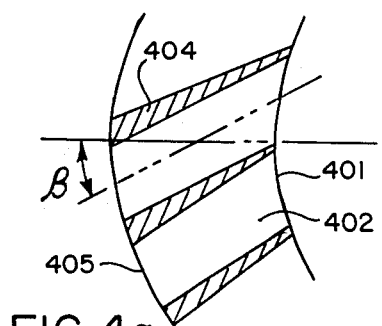
FIG. 4a is a partial, cross-sectional view showing the first and second air passages defined by the swirler vanes.
Figure 4B:
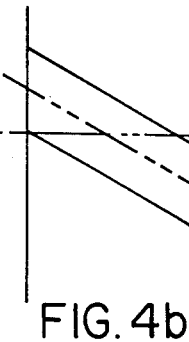
FIG. 4b is a schematic diagram showing the first acute angle of the air passages.
Figure 4C:
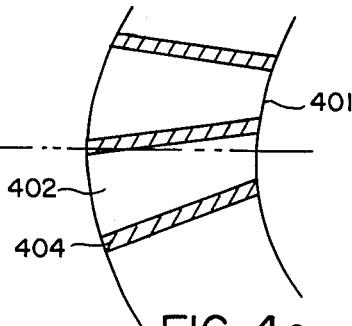
FIG. 4c is a partial, cross-sectional view showing a second embodiment of the air passages according to the invention.
Figure 5:
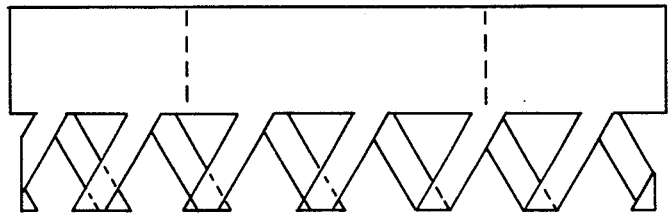
FIG. 5 is a plan view of the generally cylindrical member after the swirl vanes have been formed thereon.
Figure 6:
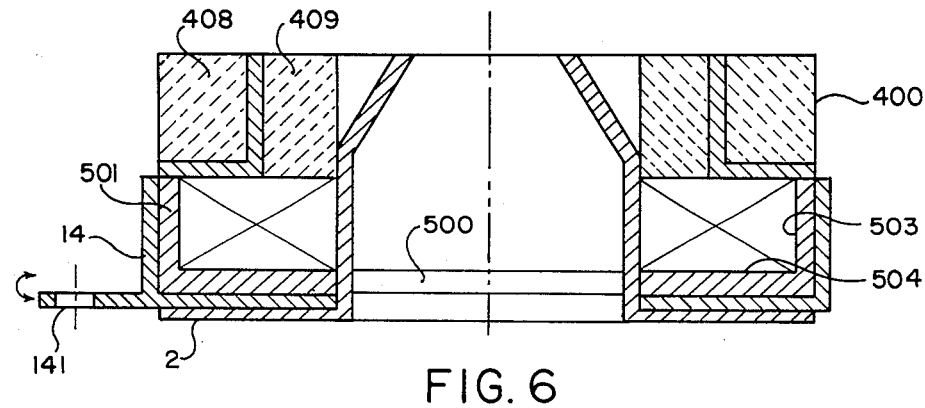
FIG. 6 is a cross-sectional view of the swirler assembly incorporating a control modulating diaphragm.

In order to provide a sufficiently large tangential component to the air passing through the swirler 4, both the radial intake and the axial intake air passages have a double phase shift. A first embodiment for forming the swirler 4 is illustrated in FIGS. 4–6. In this embodiment, the axial-centripetal swirler according to the invention is made from a generally cylindrical blank 400 having an axial bore 401 concentric about the longitudinal axis of the blank. The lower half of the blank has a somewhat smaller diameter and is spark-eroded so as to form 12 passages 402 using an electrode having either a parallelipiped shape so as to make air passages with parallel sides, as illustrated in FIG. 4a, or a trapezoidal cross-section such that the cross-sections of the swirler intakes are a maximum, as shown in FIG. 4c. The spark-eroding and machining process, per se, form no part of the present invention and any such known process may be utilized to from the passages and the vanes.

The electrode 403, which preferably has a trapezoidal cross-section is moved in a substantaily radial direction into the blank 400, but has a dual slope relative to the blank. The electrode 402 subtends an acute angle $\alpha$ relative to the generatrix of the cylinder of the blank and also an acute angle $\beta$ relative to a radius of the blank 400. Thus, each of the vanes 404 also has a dual slope of angles $\alpha$ and $\beta$ with the angle $\alpha$ providing the tangential component of the air passing through the axial intake passages 12 an the angle $\beta$ providing the tangential component to the air passing through the radial intake passages 13.

The passages 402 extend between the inner annular surface 401 and the outer cylindrical surface 405 of the blank 400, and also extend to the side 406 of the blank. After this initial step in the formation process, the blank 400 has the shape shown in FIG. 5.

After the blank 400 has been formed as shown in FIG. 5, a cover member 500, shown best in FIGS. 1a and 6, is fitted over the lower half of the blank 400 having the vanes. Cover member 500 has a generally cylindrical sidewall 501 extending therefrom with six apertures 502 regularly spaced about its circumference. The apertures 502 alternate with barriers 503 such that the barriers 503 will cover six of the passages 402 formed in the blank 400. The annular bottom portion 504 of cover 500 defines six cutouts 505 circumferentially spaced about the inner opening of cover 500 and interspaced with barriers 506. The outwardly extending sides of the cutouts 505 form an angle with a radius of the bottom portion 504.

The apertures 502 are circumferentially shifted relative to cutouts 505 such that, after the cover member 500 has been assembled onto the blank 400, barriers 503 cover alternate ones of passages 402, while the passages 402 left uncovered by barriers 503 are covered by barriers 506. This forms the alternating axial and radial passages 12 and 13 so as to form the alternating axial-centripetal air flows. Preferably, cover member 500 is hard soldered onto the blank 400 over the surface 407 which has a slightly smaller diameter than the upper portion of blank 400, as shown in FIG. 4.

The next operation is to remove the shaded parts 408 and 409 of the blank 400, as indicated in FIG. 6. The removal of parts 408 and 409 leave a generally cylindrical, axially extending portions which forms the cylindrical support 3a of the intermediate bowl member.

Figure 7:
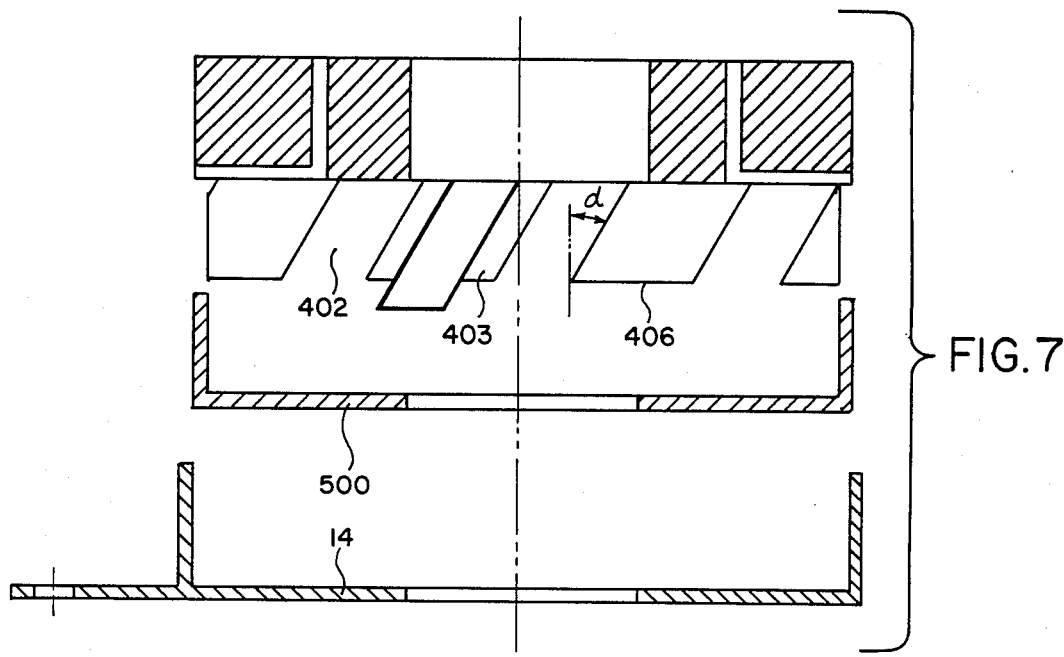
FIG. 7 is an exploded, sectional view showing a second embodiment of the swirler assembly.

In a second embodiment for forming the swirl member 4, only six passages 402 are regularly distributed about the periphery of the blank 400 as shown in FIG. 7. These passages 402 are formed by a spark-erosion method using a parallelipipetic or trapezoidal cross-sectioned electrode which moves essentially radially into blank 400 at an angle $\beta$ relative to a radius of the blank to provide the requisite tangential component to the intake air. Using a second electrode, six axial passages are formed in the blank from the front side 406 in the material remaining between the centripetal radial passages, this electrode subtending an angle $\alpha$ relative to the generatrix of a cylinder enclosing the blank 400.

Accordingly, the sides of the vanes forming the first, axial intake passages 12 slope at an angle $\alpha$, whereas the opposite sides of the same vanes, which define the second, radial intake passages 13 slope by an angle $\beta$ so as to impart a tangential component to the air flow passing through each of these passages. The ensuing installation of the cover member 500 is identical to the embodiment previously described.

The two methods described above result in the formation of an axial-centripetal swirler 4 having circumferentially alternating axial and radial passages 12 and 13, respectively, each of which are oriented so as to impart a tangential component to the air passing through them.

An air control modulating diaphragm may be mounted on the swirler so as to control the amount of air passing through the axial and radial passages. As best seen in FIG. 1a the control diaphragm 14 is rotatably mounted on the swirler 4 and may be actuated by means connected to lever 141. The diaphragm 14 comprises a first set of axial flow barriers 142 and a second set of radial flow barriers 143 to control the air flowing through the axial passages 12 and the radial passages 13, respectively.

Figure 8:
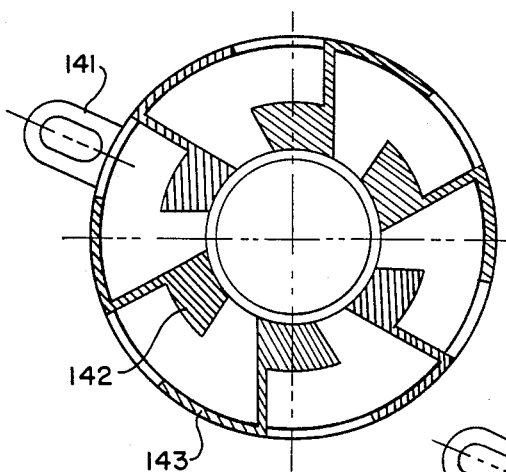
FIG. 8 is a cross-sectional view along line IV—IV in FIG. 1.

In a first embodiment of the control diaphram shown in FIG. 8, the barriers 142 are circumferentially shifted with respect to the barriers 142 such that, during the idle mode of operation of the gas turbine, the barriers will simultaneously close the axial and radial passages, as illustrated in FIG. 9a. As the control diaphragm 14 is rotated, both the axial and radial passages 12 and 13 are gradually opened, as illustrated in FIG. 9b until the full power operational mode is achieved as shown in FIG. 9c in which both the radial and axial passages are completely opened. This embodiment achieves an essentially stoichiometric operating conditions from idle to full power while at the same time having a more compact external swirler than the prior art radial swirlers.

Figure 10:
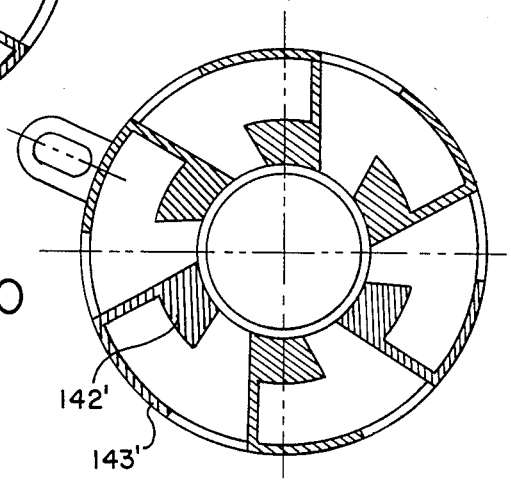
FIG. 10 shows a second embodiment of the control diaphragm of the swirler taken along line IV—IV in FIG. 1.
Figure 11C:
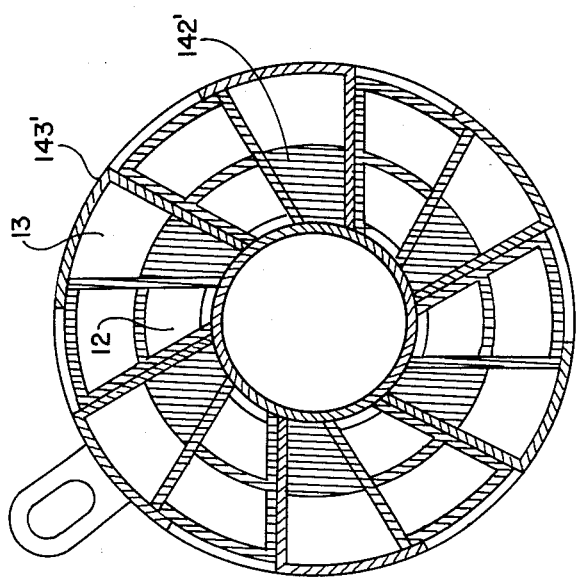
FIGS. 11a–11c shows the control diaphragm of FIG. 10 progressing from an idle operation, through an intermediate operating level, to a full power operating mode.
Figure 11B:
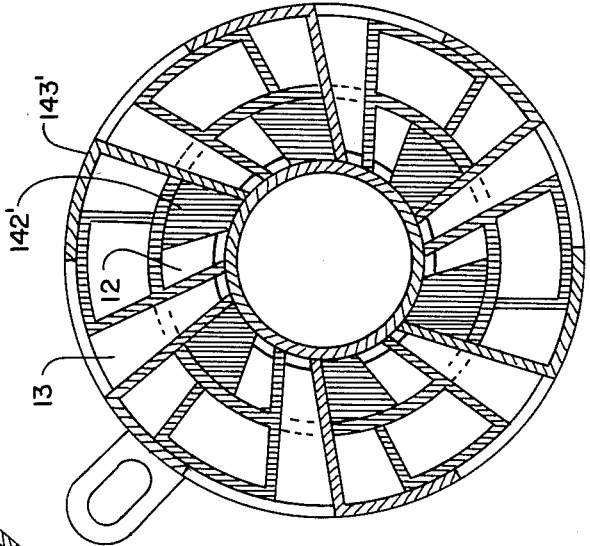
Figure 11A:
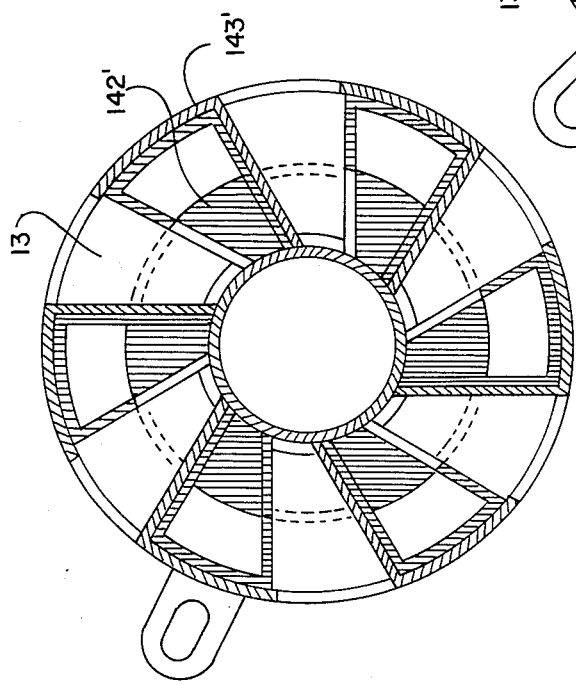

In a second embodiment of the diaphragm 14, as shown in FIGS. 10 and 11, the barriers 142' and 143' are circumferentially aligned with each other. Thus, during idle conditions, as shown in FIG. 11a, the radial passages 13 are open while the axial passages 12 are closed. As a result, the combustion chamber operation is rendered more effective by forming an outer flaring cone of turbulent air and a cone of fuel so as to lengthen the fuel dwell time in the primary zone. This serves to increase the operational stability of the gas turbine during idling.

As diaphragm 14 is rotated from the idle position shown in FIG. 11a, through an intermediate position shown in FIG. 11b to the full power position shown in FIG. 11c there is a continuous transition as the axial passages 12 are opened while the radial passages 13 are closed. This serves to increase the axial component of the turbulent air flow to provide a more constricted cone of fuel in the primary combustion zone so that the carburation is improved at full power.

Figure 2:
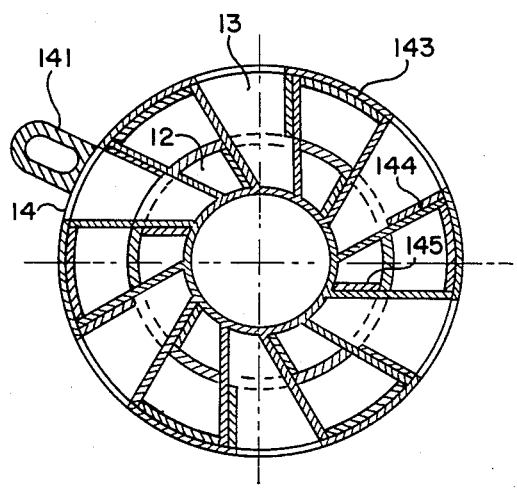
FIG. 2 is a cross-sectional view taken along line II—II in FIG. 1.
Figure 3:
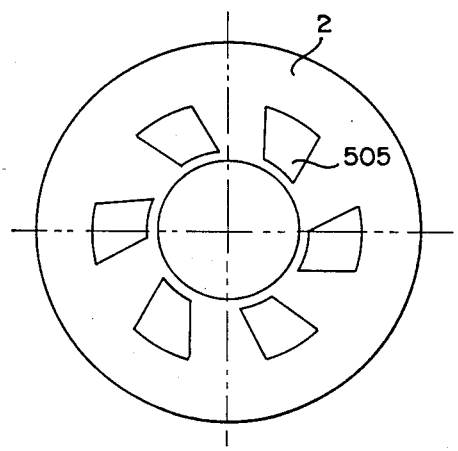
FIG. 3 is a front view of a control member utilized in the swirler of FIG. 1.

As shown in FIG. 2, guide strips 144 and 145 may be attached to diaphragm 14 so as to extend into the passages 12 and 13. When the diaphragm control is in the open position, these strips rest against one side of the passages. As the diaphragm is moved toward the closed position, these strips serve to guide the incoming air through the passages to avoid abrupt pressure drops during the closing of the diaphragm.

Figure 12:
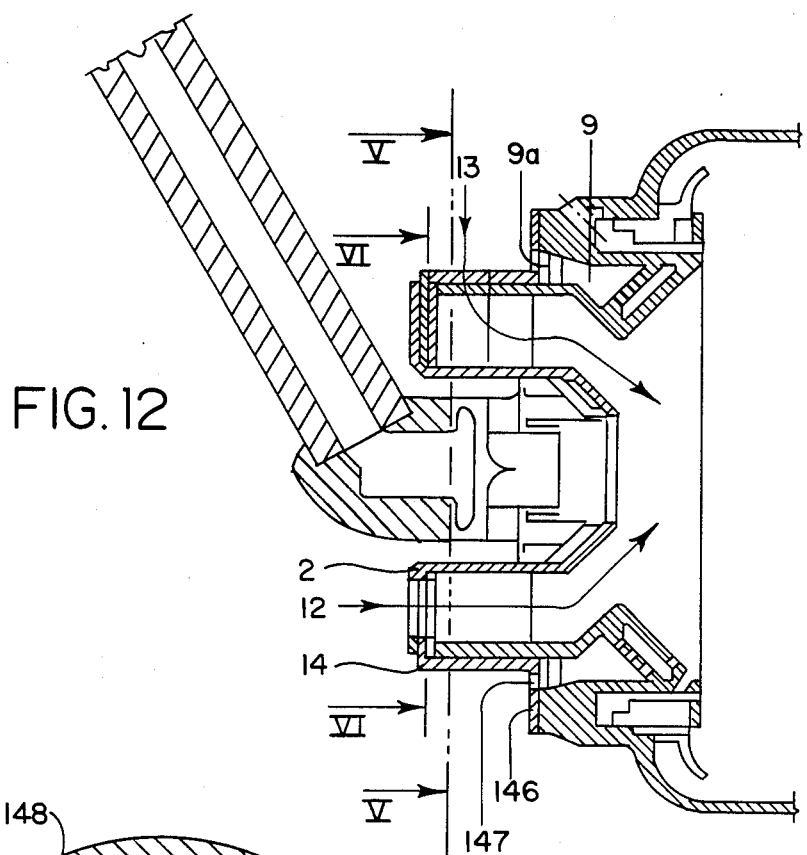
FIG. 12 is a partial, longitudinal sectional view of a second embodiment of the swirler apparatus according to the invention.
Figure 13:
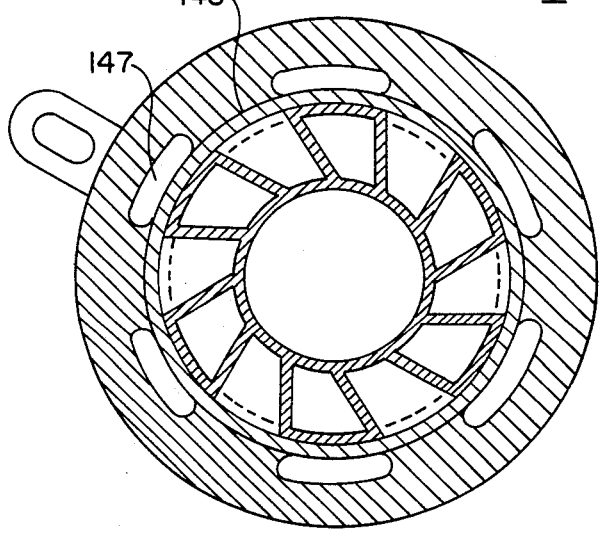
FIG. 13 is a cross-sectional view taken along line V—V in FIGS. 12.
Figure 14:
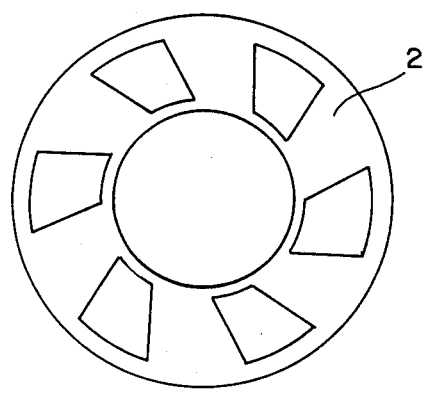
FIG. 14 is a front view of the control member utilized with the swirler apparatus shown in FIG. 12.
Figure 16:
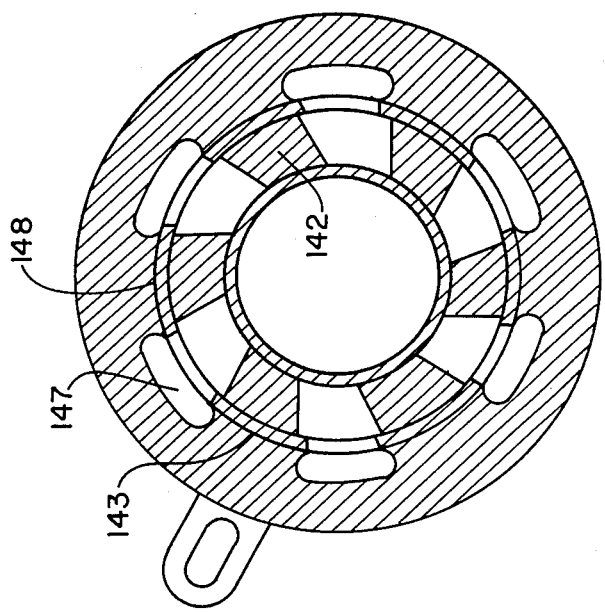
FIG. 16 is a cross-sectional view taken along line VI—VI in FIG. 12 of a second embodiment of the control modulating diaphragm.
Figure 15:
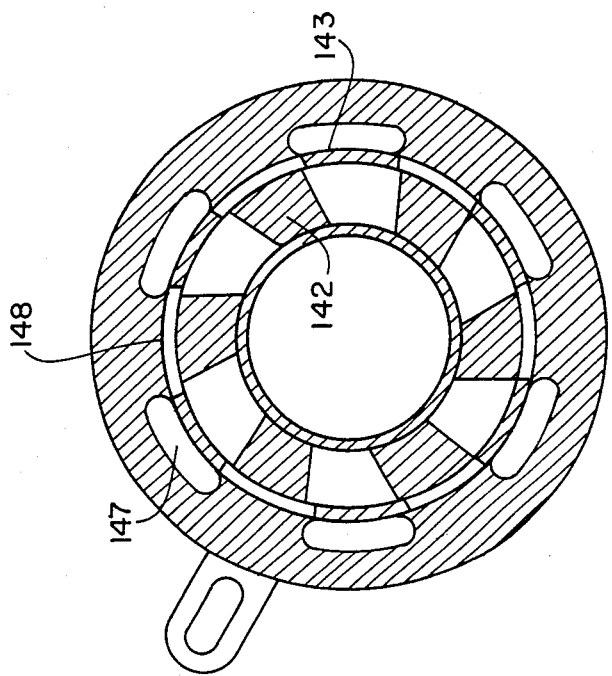
FIG. 15 is a sectional view taken along line VI—VI in FIG. 12 of a first embodiment of the control modulating diaphragm.

A second embodiment of the swirler 4 is shown in FIG. 12 and it differs from that shown in FIG. 1 insofar as the outside diameter of the swirler unit is more compact and that the diaphragm 14 has a radially extending collar 146 defining orifices 147 circumferentially spaced apart by barriers 148 to open or close the air intakes 9a so as to control the air flowing into impingement cooling chamber 9. As shown in FIG. 15, the first, second and third barriers 142, 143 and 148, respectively are circumferentially shifted such that the axial and radial passages as well as the orifices 9a are simultaneously opened or closed as the control diaphragm 14 is rotated. In FIG. 16, all of the barriers are circumferentially aligned such that during idling conditions, the radial passages 13 as well as the orifices 9a are opened while the axial passages 12 are closed. At full power, only the axial passages 12 are opened.

FIG. 17 shows a swirler according to the invention utilized in conjunction with a fuel injector 20 having a base 21 for the pressurized fuel intake. In this type of fuel injector, the fuel passes through ducts 22 and into an annular fuel injection manifold 23 and exits therefrom between an inner and outer air flow. When utilized with a fuel injector of this type, the central sleeve 2 of the swirler defines apertures 24 aligned with each of the radial passages 13 so as to allow the air, after passing through radial passages 13 to issue from the center of the injector 20 to form the inner swirl flow. The air passing through axial passages 12 forms the external swirl flow to achieve the proper atomization of the fuel. The radial passages 13 of the axial-centripetal unit, therefor, amount of an inner swirler having a radial intake, whereas the axial passages 12 amount to an external axial swirler for the injection apparatus.

FIG. 18 shows the swirler unit according to the invention utilized in conjunction with a central injector 30 having a swivel mounting 31 so as to position it within the sleeve 2. As in the previous embodiments, sleeve 2 is provided with a plurality of radial apertures 24 aligned with the radial passages 13 to allow the air passing therethrough to flow around the injection duct 30 and thrust the fuel emanating from apertures 32 inside the flow of the inner swirler. The axial air feed is provided by the axial passages 12 and may be supplemented by an axial-centripetal feed through orifice 33.

In the embodiments shown in FIGS. 17 and 18, the diaphragm 14 has radial collar 146 to control the air passing into the annular impingement cooling chamber 9.

The application of the invention to the two types of injectors shown in FIGS. 17 and 18 is of major interest insofar as it allows the modulation of the air flow of the inner swirler as a function of the operational conditions. The diaphragms for the embodiments shown in FIGS. 17 and 18 may include either in-phase axial and radial barriers or phase-shifted barriers as previously described. However, since some air flow is mandatory to atomize the fuel under idle conditions, the preferred embodiment is to utilize the in-phase barriers since it permits an air flow through the radial intake passages 13.

In all of the embodiments shown, the fuel atomization may be completed by a circular set of orifices 10a continuously fed through orifices 9b which have no control diaphragms and are formed through the attaching nut 7. Air passing through these orifices 9b also serve to ventilate the intermediate bowl member downstream of collar 3d.

The angles $\alpha$ and $\beta$ of the axial and radial swirlers may be varied for each application to achieve the desired atomization of the fuel jet as a function of the operational mode and to optimize either the combustion quality of the cooling of the intermediate bowl member. Thus, at idle, there should be a spread out layer of fuel so as to achieve the necessary combustion stability. This is achieved by means of the radial swirler having a larger tangential component and tending to disperse the fuel jet so as to increase the dwell time in the primary combustion zone to reduce the production of carbon oxides and unburned substances.

At full power, on the other hand, the axial combustion is more important than the higher reaction rates and the use of the axial swirler make it possible to simultaneously reduce the dwell time and, consequently, the nitrogen-oxide emissions.

The foregoing is provided for illustrative purposes only and should not be construed as in any way limiting this invention, the scope of which is defined solely by the appended claims.

What is claimed is:

1. Axial-centripetal swirling apparatus for directing air into a combustion chamber of a gas turbine engine in a swirling fashion so as to thoroughly mix the air with fuel, the gas turbine having at least one fuel injector, a combustion chamber and an intermediate bowl-shaped member interconnecting the fuel injector and the combustion chamber defining an impingement cooling chamber and air intake orifices therefor, the swirling apparatus comprising:
    (a) a first generally cylindrical member having a longitudinal axis mounted on the at least one fuel injector extending in a plane generally perpendicular to the at least one fuel injector;
    (b) an even number of swirler vanes formed on the first generally cylindrical member extending in a generally radial direction defining an even number n of air passages therebetween; and
    (c) a generally circular cover member having n/2 circumferential barriers and n/2 planar barriers thereon mounted to the first generally cylindrical member such that the circumferential barriers extend between radially outermost ends of adjacent swirler vanes and the planar barriers extend between radial edges of adjacent swirler vanes so as to form radial air passages alternating with axial air passages in a circumferential direction.

2. The apparatus according to claim 1 wherein each swirler vane subtends a first acute angle $\alpha$ with a generatrix of a cylinder about the longitudinal axis enclosing the swirler vanes and a second acute angle $\beta$ with a radius of the generally cylindrical member.

3. The apparatus according to claim 1 wherein facing sides of adjacent swirler vanes which define first air passages subtend an acute angle $\alpha$ with a generatrix of a cylinder about the longitudinal axis enclosing the swirler vanes and the opposite sides of these vanes which define second air passages subtend a second acute angle $\beta$ with a radius of the cylindrical member.

4. The apparatus according to claim 1 further comprising an intake air modulating diaphragm comprising:
    (a) an annular ring mounted on the cylindrical member such that an axis of symmetry of the annular ring is coincedent with the longitudinal axis of the cylindrical member;
    (b) a first plurality of air control barriers on the annular ring to control the flow of air into the radial air passages;
    (c) a second plurality of air control barriers on the annular ring to control the flow of air into the axial air passages; and, (d) control means to oscillate the annular ring about its axis of symmetry such that the first and second plurality of air control barriers may be moved relative to the radial and axial air passages between closed positions, in which air flow through the air passages is prevented, and open positions in which air flow through the air passages is unrestricted by the barriers.

5. The apparatus according to claim 4 further comprising a collar attached to the annular ring having a plurality of third air control barriers thereon to control the flow of air into the intake orifices for the impingement cooling chamber.

6. The apparatus according to claim 4 wherein the first plurality of air control barriers are circumferentially displaced from the second plurality of air control barriers such that, the radial and axial air passages are simultaneously opened or closed.

7. The apparatus according to claim 6 further comprising a collar attached to the annular ring having a plurality of third air control barriers thereon to control the flow of air into the intake orifices for the impingement cooling chamber.

8. The apparatus according to claim 7 wherein the third air control barriers are circumferentially aligned with the second air control barriers.

9. The apparatus according to claim 7 wherein the third air control barriers are circumferentially displaced from the second air control barriers.

10. The apparatus according to claim 4 wherein the first plurality of air control barriers are circumferentially aligned with the second plurality of air control barriers such that, as the radial air passages are opened, the axial air passages are closed, and vice versa.

11. The apparatus according to claim 10 further comprising a collar attached to the annular ring having a plurality of air control barriers thereon to control the flow of air into the intake orifices for the impingement cooling chamber.

12. The apparatus according to claim 11 wherein the third air control barriers are circumferentially aligned with the second air control barriers.

13. The apparatus according to claim 11 wherein the third air control barriers are circumferentially displaced from the second air control barriers.

14. The apparatus according to claim 1 wherein the at least one fuel injector has a cooled base and an annular injection manifold, and further comprising means to direct air flowing through the radial air passages into the fuel injector and through the annular injection manifold.

15. The apparatus according to claim 1 wherein the at least one fuel injector has a nozzle and a sleeve surrounding the nozzle and further comprising means to direct air flowing through the radial air passages into the sleeve.

* * * * *

UNITED STATES PATENT AND TRADEMARK OFFICE
CERTIFICATE OF CORRECTION

PATENT NO. : 4,754,600

DATED : July 5, 1988

INVENTOR(S) : BARBIER ET AL

It is certified that error appears in the above-identified patent and that said Letters Patent is hereby corrected as shown below:

Col. 1, line 27, "idler" should be --idle--.

Col. 1, line 34, "variably" should be --variable--.

Col. 1, line 48, "produces" should be --produce--.

Col. 2, line 1, delete "of operational" and insert --to open--.

Col. 2, line 6, "types" should be --type--.

Col. 2, line 42, "secon" should be --second--.

Col. 2, line 60, "idler" should be --idle--.

Col. 3, line 1, "a central fuel injector" should be --the cooled base type--.

Col. 3, line 37, "view along" should be --view taken along--.

Col. 4, line 17, "References" should be --Reference is--.

Col. 5, line 6, "to from" should be --to form--.

Col. 5, line 16, "an" should be --and--.

Col. 5, line 52, "portions" should be --portion--.

Col. 6, line 25, "barriers 142" should be --barriers 143--.

UNITED STATES PATENT AND TRADEMARK OFFICE
CERTIFICATE OF CORRECTION

PATENT NO. : 4,754,600

DATED : July 5, 1988

INVENTOR(S) : BARBIER ET AL

It is certified that error appears in the above-identified patent and that said Letters Patent is hereby corrected as shown below:

Col. 7, line 28, "therefor" should be --therefore--.

Col. 10, line 11, "air-control barriers" should be --third air-control barriers--.

Signed and Sealed this

Twenty-fourth Day of January, 1989

Attest:

DONALD J. QUIGG

Attesting Officer      Commissioner of Patents and Trademarks